US005778925A

United States Patent [19]

Cooke

[11] Patent Number: 5,778,925

[45] Date of Patent: Jul. 14, 1998

[54] PRESSURE REGULATION VALVE

[75] Inventor: Michael Peter Cooke, Gillingham, United Kingdom

[73] Assignee: Lucas Industries Public Limited Company, England

[21] Appl. No.: 517,430

[22] Filed: Aug. 21, 1995

[30] Foreign Application Priority Data

Aug. 19, 1994 [GB] United Kingdom .................. 9416784

[51] Int. Cl.[6] .................................................. F16K 17/18

[52] U.S. Cl. .................. 137/493.6; 123/467; 137/493.9; 137/508

[58] Field of Search ............................ 137/493.1, 493.6, 137/493.09, 508; 123/467

[56] References Cited

U.S. PATENT DOCUMENTS

| | | | |
|---|---|---|---|
| 2,033,839 | 3/1936 | Lawson . | |
| 2,591,401 | 4/1952 | Camner . | |
| 3,258,029 | 6/1966 | Parrino | 137/508 |
| 3,722,535 | 3/1973 | Raupp | 137/493.6 X |
| 4,256,093 | 3/1991 | Helms et al. | 137/508 |
| 4,440,189 | 4/1984 | Graham | 137/508 X |
| 5,085,604 | 2/1992 | Onoue et al. | 137/508 X |

FOREIGN PATENT DOCUMENTS

| | | |
|---|---|---|
| 0153490 | 12/1984 | European Pat. Off. . |
| 174903 | 11/1963 | U.S.S.R. . |
| 728697 | 12/1952 | United Kingdom . |

*Primary Examiner*—Stephen M. Hepperle
*Attorney, Agent, or Firm*—Cesari and McKenna, LLP

[57] ABSTRACT

A pressure regulation valve is disclosed which comprises a housing including first and second ports, a support for slidably supporting a tubular member defining a valve seat against which a valve element is engageable. The tubular member and valve element are spring biased into engagement with one another. In use, the application of pressurized fuel to the first port pushes the tubular member against the stop, the valve element being able to leave the valve seat in order to permit fuel flow through the valve. If the second port is at a higher pressure than the first port, the valve element moves into engagement with the valve seat, the application of a high pressure resulting in the valve element and tubular member moving until the valve element engages the support, further movement of the tubular member permitting fuel flow through the valve from the second port to the first port.

9 Claims, 3 Drawing Sheets

PRESSURE REGULATION VALVE

This invention relates to a pressure regulation valve, and particularly to a valve for use in the regulation of fuel pressure in a fuel delivery line used to deliver fuel from an injection pump to an injection nozzle of a diesel internal combustion engine.

The fuel systems of diesel engines commonly suffer from the problem that at the end of delivering fuel to the cylinders, the closing of the valves in the injection nozzles results in shock waves being transmitted along the fuel delivery lines towards the injection pump. Delivery valves are commonly provided in the delivery lines, and on the shock wave reaching the delivery valve, the wave is reflected and may result in the injection valve being reopened to deliver additional fuel to the engine, such additional fuel being delivered in the form of relatively large droplets leading to excessive smoke in the engine exhaust.

It is an object of the invention to provide a pressure regulation valve in which the above described disadvantages are reduced.

According to the present invention there is provided a pressure regulation valve comprising a valve element movable within a housing having first and second ports, and engageable with a valve seat in order to restrict the flow of fuel from the second port to the first port, and means for separating the valve element from the valve seat in order to selectively permit the flow of fuel from the second port to the first port.

The valve seat is preferably provided on a tubular member slidable upon a support between a position in which the valve element engages with the seat, and a position in which the support lifts the valve element from the seat. The valve element is preferably movable within the housing with respect to the support.

The invention will further be described, by way of example, with reference to the accompanying drawings, in which.

Figure 1:
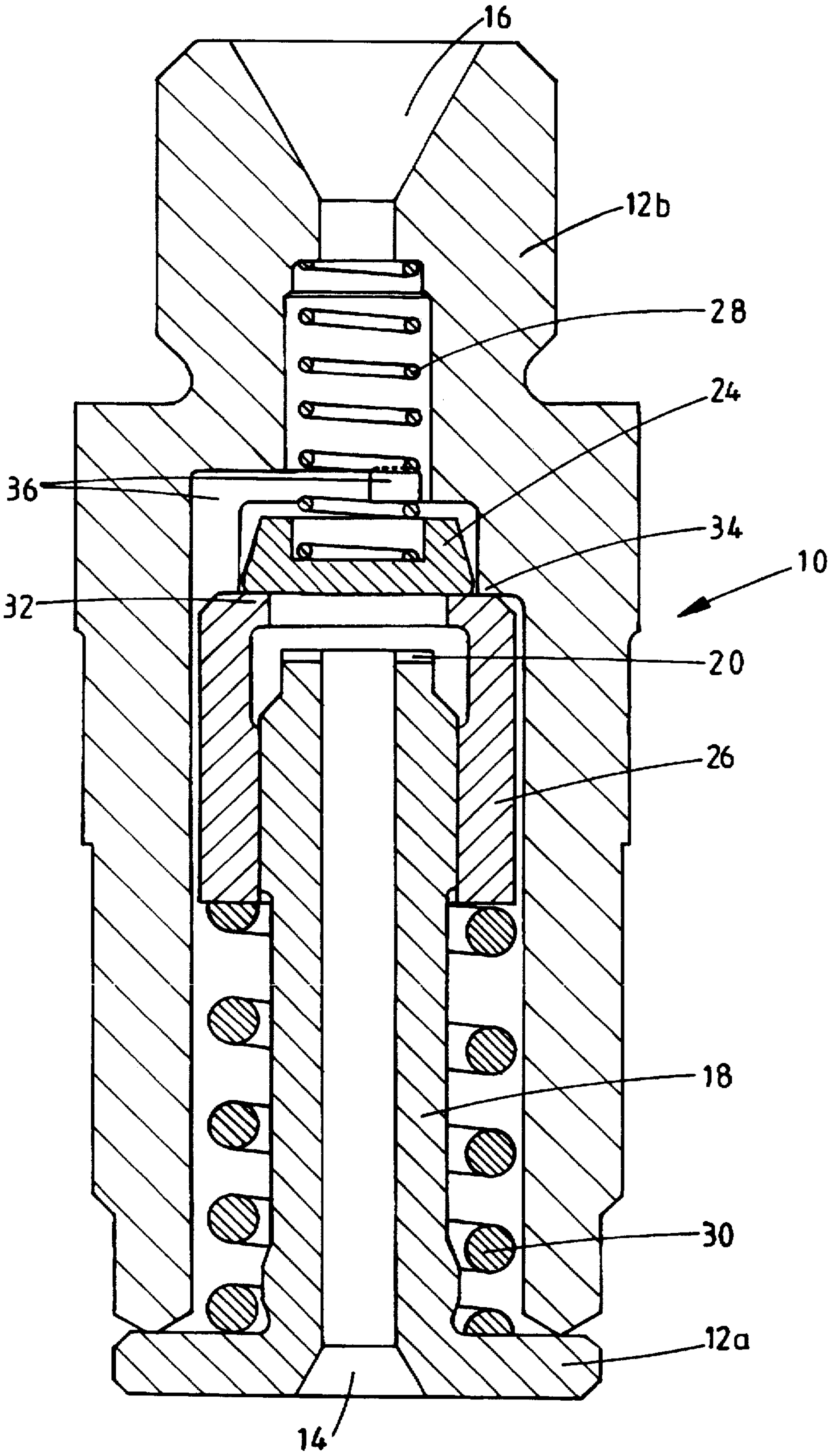
FIG. 1 is a cross-sectional view of a pressure regulator valve in accordance with an embodiment of the invention.

The pressure regulation valve 10 illustrated in the accompanying drawings is intended for use in the fuel system of a diesel internal combustion engine. The valve 10 comprises a two part valve housing **12*a*, 12*b* having an inlet 14 arranged to be connected to a delivery port of a distributor pump, and an outlet port 16** arranged to be connected to a fuel line for carrying fuel from the distributor pump to the injector associated with a cylinder of the engine.

The part **12*a* of the housing provided with the inlet port 14 includes an integral tubular support 18 extending within the housing 12*b*, the passage in the tubular support 18 communicating with the inlet port 14. The free end of the tubular support 18 defines a stop surface 20 which is provided with a plurality of radially extending grooves or channels. The tubular support 18 may be located by means of a projection on the housing part 12*a* and which locates with the housing part 12*b***.

A valve element 24 is provided within the housing **12*b*. The valve element 24 comprises a truncated conical element having a generally flat lower surface, the upper surface of the element being provided with a cylindrical recess within which an end of a helical spring 28 is arranged to engage, the other end of the spring 28 engaging with part of the housing 12*b* adjacent the outlet port 16 to bias the valve element 24 towards the stop surface 20, movement of the valve element 24 towards the inlet port 14 being limited by engagement of the valve element 24 with the stop surface 20**.

The valve further comprises a tubular member 26 which takes the form of an open cylinder arranged to slide on the tubular support 18, the dimensions of the member 26 being such as to form a fluid seal between the inner surface o f the member 26 and the outer surface of the tubular support 18. A helical spring 30 is arranged to engage with the end of the member 26 remote from the valve element 24, and to engage with the housing **12*a* adjacent the inlet port 14 in order to bias the member 26 towards the valve element 24**.

The end of the member 26 adjacent the valve element 24 includes an inwardly extending flange 32 limiting movement of the member 26 with respect to the tubular support 18, the outer surface of the flange 32 being arranged to engage with part of the generally flat lower surface of the valve element 24 to form a substantially fuel tight seal, the outer surface of the flange 32 defining a valve seat.

Figure 2:
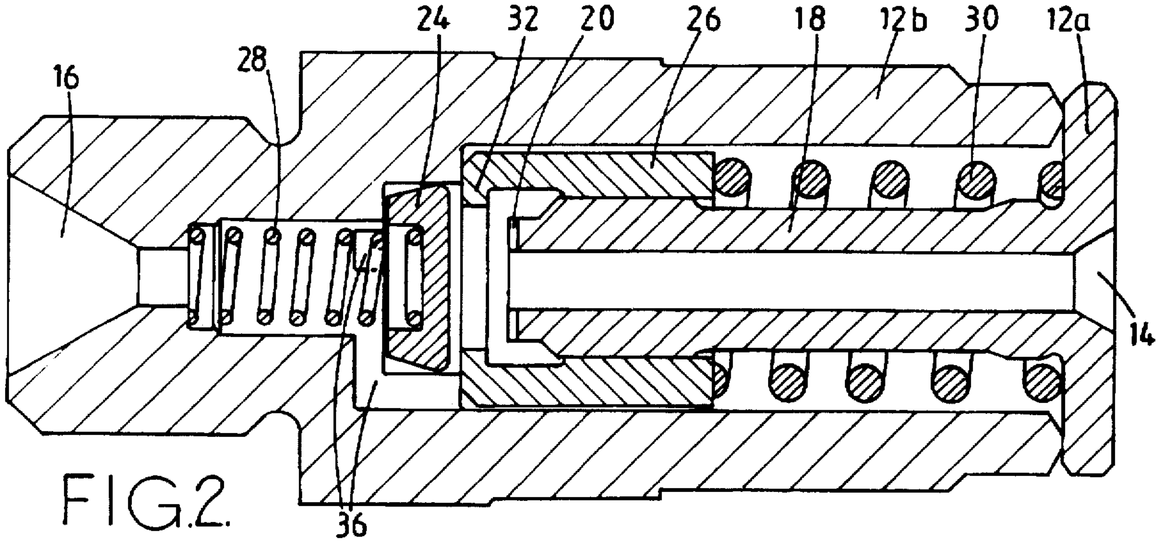
FIGS. 2, 3 and 4 are views of the valve of FIG. 1 in various positions, in use.

In use, starting from the position shown in FIG. 1, on supplying fuel from the distributor pump to the inlet port 14, once the pressure of the fuel supplied exceeds the pressure of fuel in the delivery line by an amount sufficient to overcome the action of the spring 28, the valve element 24 will move away from the member 26. The member 26 is spring biased towards the valve element 24, but movement thereof is restricted by the engagement of the member 26 with stops 34 provided on the interior of the housing **12*b*. As soon as the valve element 24 and member 26 separate, fuel flows therebetween and through channels 36 provided in the housing 12*b* around the valve element 24, enabling fuel to flow from the inlet port 14 to the outlet port 16. Such a position is illustrated in FIG. 2**.

On completion of fuel delivery to the engine, the pressure of fuel supplied to the inlet port 14 falls resulting in the valve element 24 moving towards the stop surface 20 under the influence of the spring 28, a point being reach at which the valve element 24 and member 26 contact one another cutting off communication between the inlet and outlet ports 14, 16. The valve 10 then assumes a position similar to that illustrated in FIG. 1. The termination of delivery of fuel to the delivery line results in the fuel pressure therein falling, and the valve in the injection nozzle closing, terminating the delivery of fuel to the cylinder of the engine.

Figure 3:
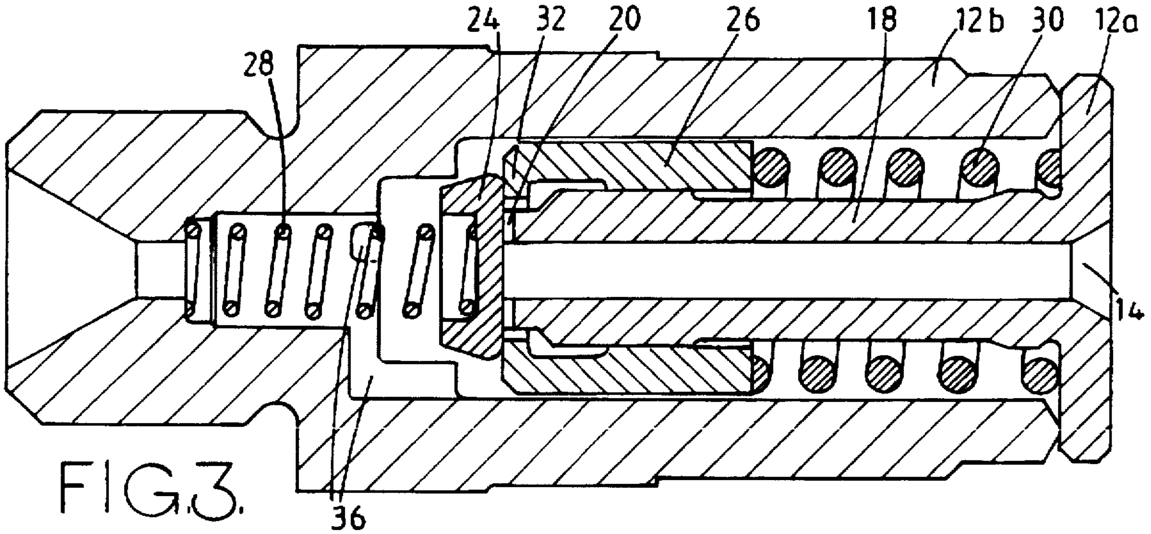
Figure 4:
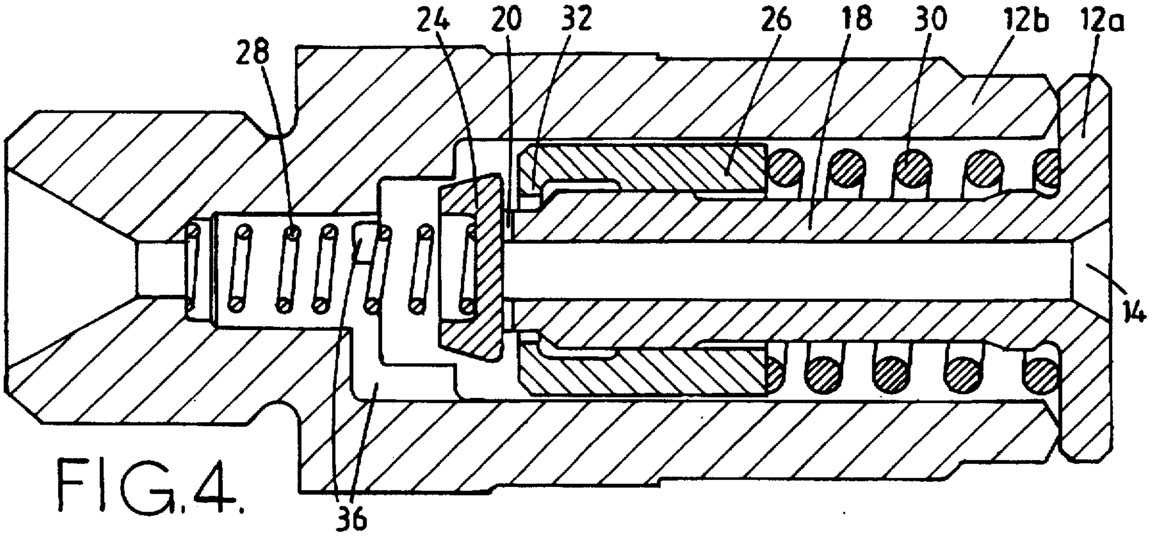

It is common for a shock wave to occur in the delivery line upon closure of the injector, and on such a wave reaching the valve 10, the high pressure pushes the valve element 24 and member 26 towards the stop surface 20 against the action of spring 30 whereon further movement of the valve element 24 is prevented. Such movement acts to damp the shock wave by increasing the volume available to the fuel in the delivery line. This position is shown in FIG. 3. Any excess pressure pushes the member 26 against the action of the spring 30, such movement separating the valve element 24 from the member 26, allowing fuel to flow therebetween and through the grooves or channels provided in the stop surface 20. Such a position is shown in FIG. 4. It will be recognized that such a flow of fuel further damps the shock wave.

The spring 30 associated with the member 26 is of sufficient strength to prevent fuel flowing between the valve element 24 and the member 26 when the fuel pressure in the delivery line is below approximately 140 Bar. It will therefore be recognized that damping of the shock wave does not result in the pressure of fuel in the delivery line falling below the combustion chamber pressure while the valve in the fuel injection nozzle is open.

Once the pressure of fuel in the delivery line has stabilized, the spring 30 pushes the member 26, and hence the valve element 24 away from the stop surface 20 to a position such as that shown in FIG. 1 in which the valve element 24 engages with the valve seat of the member 26, such movement forcing some of the fuel within the housing 12a, 12b to move into the delivery line increasing the pressure of the fuel in the delivery line.

The rate at which fuel passes through the valve 10 from the outlet port 16 to the inlet port 14 as a result of excess pressure in the delivery line is dependent upon the size of the grooves or channels provided in the stop surface 20. If it is desired to increase the rate of flow, the channels or grooves may be increased in size or increased in number.

Figures 5, 6, 7:
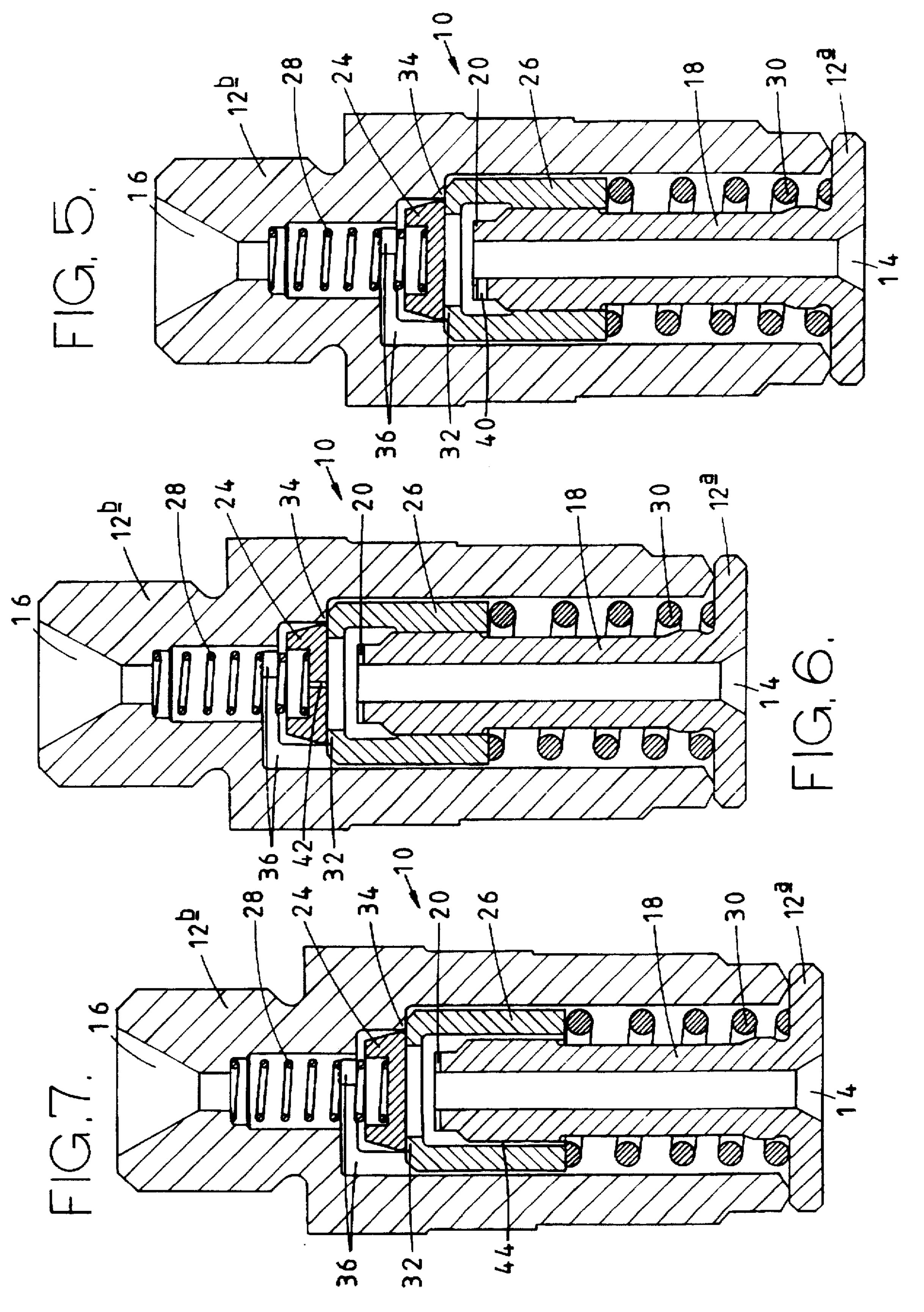
FIGS. 5, 6 and 7 are views similar to FIG. 1 of modifications thereto.

Alternatively the channels or grooves may be replaced by an orifice 40 formed in the side wall of the support 18 (see FIG. 5). Moreover, the clearance between the member 26 and the inner wall of the housing part 12b can be tailored to damp the movement of the member.

In the modification to the above described device illustrated in FIG. 6, an aperture 42 is provided in the valve element 24 permitting a limited amount of fuel to flow therethrough regardless as to the position thereof. The provision of the aperture 42 does not significantly affect the operation of the valve 10 in damping any shock waves transmitted along the delivery line, but does not result in the final movement of the valve element 24 pressurizing the delivery line, the movement merely ensuring that the delivery line is full, excess fuel draining through the aperture 42 and out of the valve 10.

In the alternative illustrated in FIG. 7, the clearance 44 between the member 26 and the tubular support 18 is sufficiently large to permit fuel to flow therebetween. Such an increased clearance 44 has the same effect as the provision of then aperture 42, the fuel draining from the delivery line along a path between the member 26 and the housing 12b and then between the member 26 and the tubular support 18.

I claim:

1. A fuel system pressure regulation valve for use in controlling the fuel pressure within a fuel supply line, the valve comprising a housing having first and second ports, a valve element moveable within the housing and biased into engagement with a moveable seating member to restrict the flow of fuel from the second port to the first port, the valve element being moveable away from the seating member upon the application of high pressure fuel to the first port to permit fuel to flow from the first port to the second port, and means for separating the valve element from the seating member in order to permit the flow of fuel from the second port to the first port upon the fuel pressure at the second port exceeding that at the first port by more than a predetermined pressure difference.

2. A valve as claimed in claim 1, wherein the seating member is a tubular member slidable upon a support between a position in which the valve element engages with the seating member and a position in which the support lifts the valve element from the seating member.

3. A valve as claimed in claim 2, wherein the valve element is movable within the housing with respect to the support.

4. A valve as claimed in claim 3, wherein the support is provided with at least one passage arranged to permit fuel to flow therethrough when the valve element is lifted from the seating member.

5. A valve as claimed in claim 4, wherein the at least one passage comprises at least one groove provided in a face of the support arranged to engage the valve element.

6. A valve as claimed in claim 4, wherein the at least one passage comprises at least one orifice provided in the wall of the support.

7. A valve as claimed claim 1, wherein the valve element is provided with an opening extending therethrough permitting a limited amount of fuel flow from the second port to the first portion when the valve element is in engagement with the seating member.

8. A valve as claimed in claim 2, wherein a clearance of sufficiently large width to permit fuel flow therethrough is provided between the support and the tubular member.

9. A valve as claimed in claim 2, wherein the valve member is spring biased into engagement with the seating member.

* * * * *